INVENTOR.
DONALD C. ROWE
BY Robert J. McDonnell
Franklin J. Vick
HIS ATTORNEYS

INVENTOR.
DONALD C. ROWE
BY Robert J. McDonnell
Franklin J. Visk
HIS ATTORNEYS

June 4, 1968 D. C. ROWE 3,386,863
METHOD AND APPARATUS FOR FABRICATING A HOLLOW PART
Filed Jan. 13, 1964 8 Sheets-Sheet 4

INVENTOR.
DONALD C. ROWE
BY
HIS ATTORNEYS

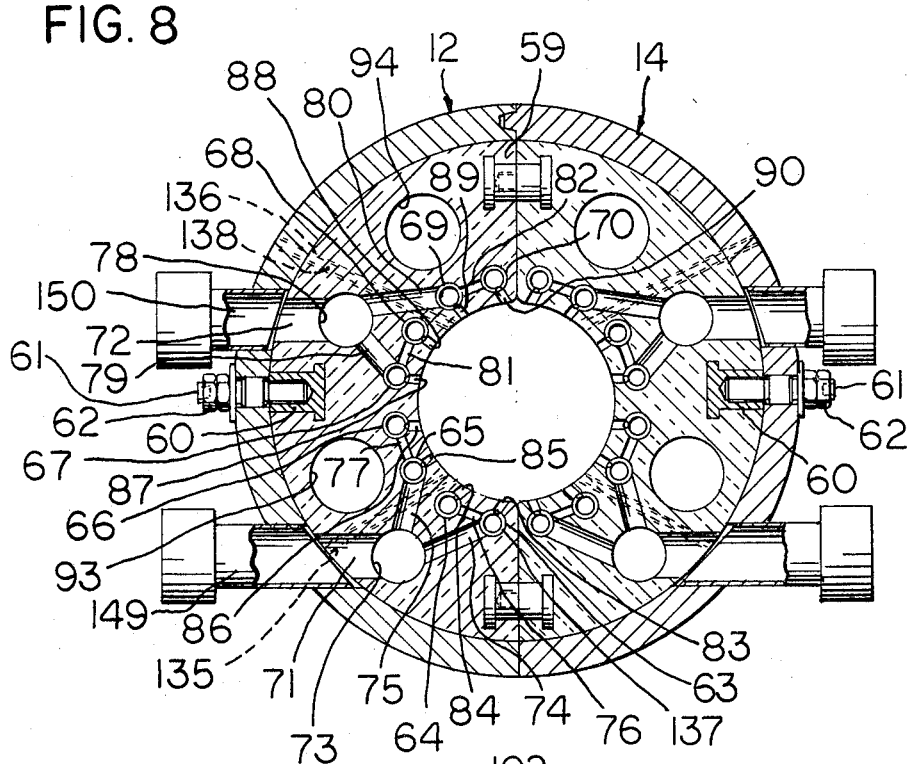
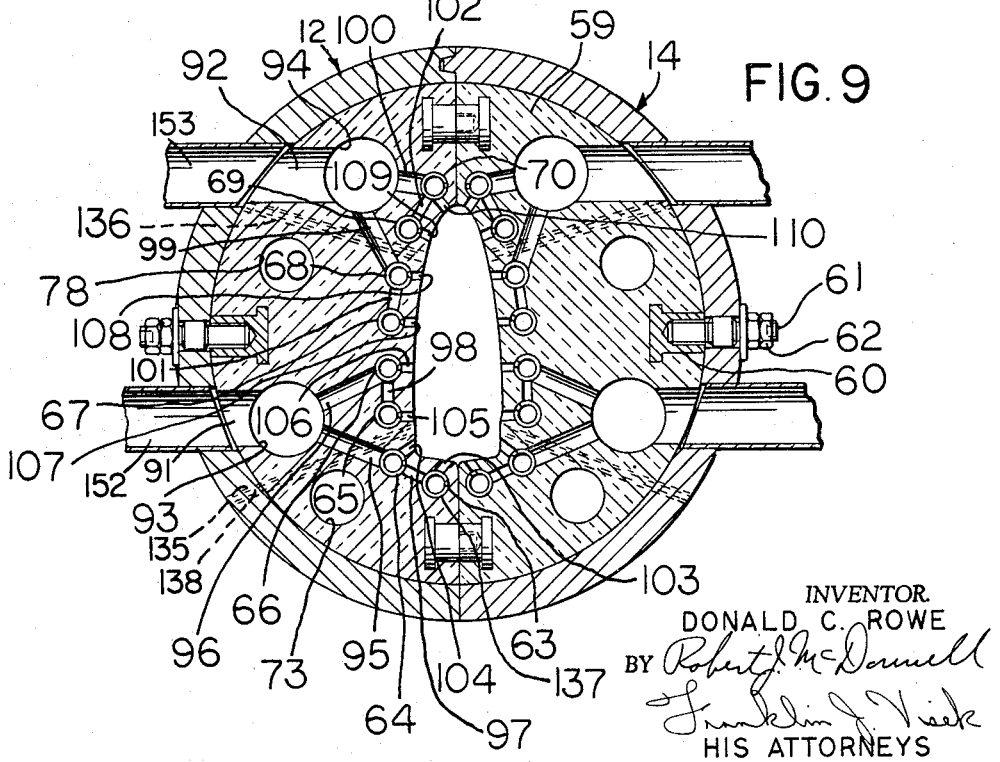

June 4, 1968   D. C. ROWE   3,386,863
METHOD AND APPARATUS FOR FABRICATING A HOLLOW PART
Filed Jan. 13, 1964   8 Sheets-Sheet 6

INVENTOR.
DONALD C. ROWE
BY
HIS ATTORNEYS

June 4, 1968  D. C. ROWE  3,386,863
METHOD AND APPARATUS FOR FABRICATING A HOLLOW PART
Filed Jan. 13, 1964  8 Sheets-Sheet 8

INVENTOR.
DONALD C. ROWE
BY
HIS ATTORNEYS

United States Patent Office 3,386,863
Patented June 4, 1968

3,386,863
METHOD AND APPARATUS FOR FABRICATING A HOLLOW PART
Donald C. Rowe, Glen Mills, Pa., assignor to The Boeing Company, Seattle, Wash., a corporation of Delaware
Filed Jan. 13, 1964, Ser. No. 337,448
24 Claims. (Cl. 148—12.1)

This invention relates to a method and apparatus for fabricating a hollow part and, more particularly, to a method and apparatus for heat-treating, forming, and tempering a hollow part to provide it with certain metallurgical properties and within certain tolerance limitations.

The hollow spar, which forms the support for a helicopter rotor blade, is one of the sources of vibration problems in a helicopter. Since it is desired that the rotor blades be balanced with respect to each other to reduce the vibration problems, it is desirable that the spars be as similar to each other in configuration and weight as possible.

Present manufacturing equipment does not permit the production of a spar with uniform tolerances and with uniform metallurgical characteristics. The operational and maintenance cost of the present equipment is considered excessive for the accomplished results. The present invention satisfactorily solves these problems by providing a spar with a very close tolerance whereby the dimensional characteristics of the spar approach uniformity to an extent that the vibrations, which are presently created due to the spar, are substantially reduced. Similarly, the present invention also creates a spar with a reasonable operating and maintenance cost in which the spar has uniform metallurgical characteristics.

An object of this invention is to provide a method and apparatus for forming a spar of a helicopter rotor blade with a close tolerance and with desired metallurgical properties.

Another object of this invention is to provide a self-contained furnace for providing a final product with certain metallurgical properties and within certain tolerance limitations.

A further object of this invention is to provide a self-contained furnace for heat-treating a hollow part, forming the hollow part to a desired shape, quenching the hollow part, and tempering the hollow part with all of the foregoing being performed in a controlled atmosphere.

Other objects of this invention will be readily perceived from the following description, claims, and drawings.

This invention relates to a process for forming a hollow part comprising the steps of heating the part until the material of the part is readily deformable and maintaining an inert atmosphere about the part when it is heated. The process also includes supplying high pressure fluid to the interior of the hollow part when the material of the part is deformable to form the part to its desired shape and cooling the part rapidly after it has been formed to its desired shape.

This invention also relates to a furnace having a closed heating chamber with the walls of the heating chamber being shaped to produce a desired configuration. The furnace has means to support a hollow part in the heating chamber and means to heat the heating chamber. There also is means to maintain an inert atmosphere in the heating chamber when the heating means is heating the hollow part. The furnace includes means to supply fluid to the interior of the part to maintain an interior pressure to urge the part against the walls of the heating chamber when the part is heated to a deformable temperature whereby the part is formed in the desired configuration. Means is provided to cool the part when the heating means is not supplying heat to the heating chamber.

The attached drawings illustrate a preferred embodiment of the invention, in which FIGURE 1 is a side elevational view of the furnace of the present invention;

FIGURE 8 is a sectional view of a ceramic member including a portion of the inlet system for the inert gas;

FIGURE 9 is a sectional view of a ceramic member including a portion of the exhaust system for the inert gas;

Figure 1:
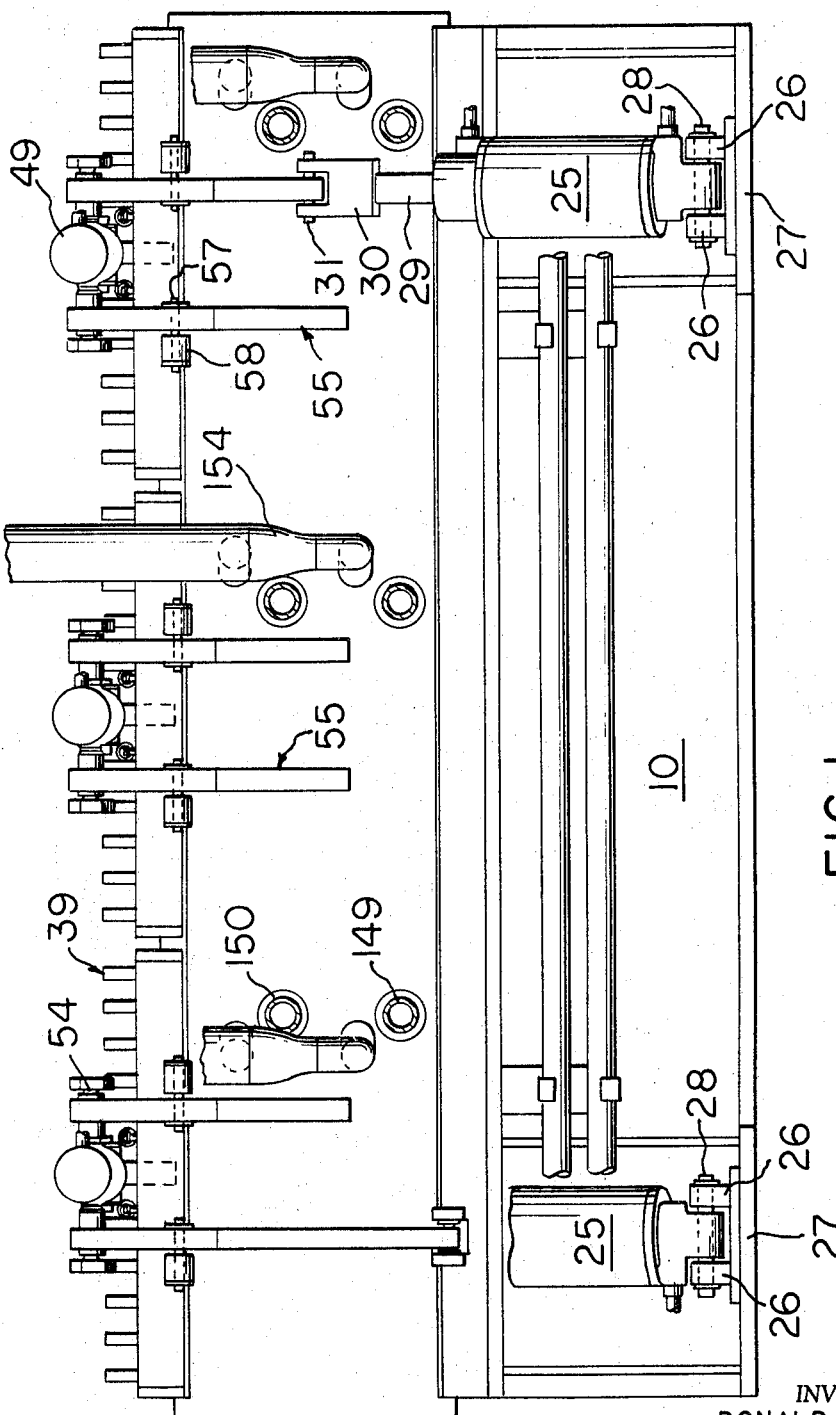
Figure 2:
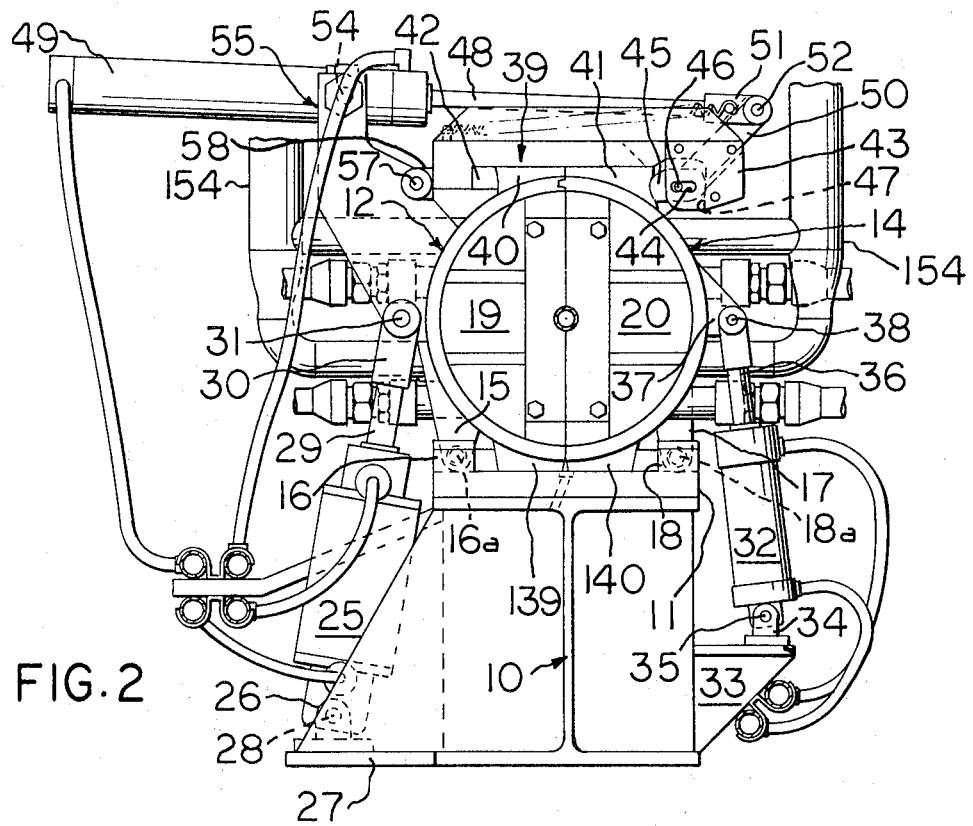
FIGURE 2 is an end elevational view of the furnace of FIGURE 1.
Figure 3:
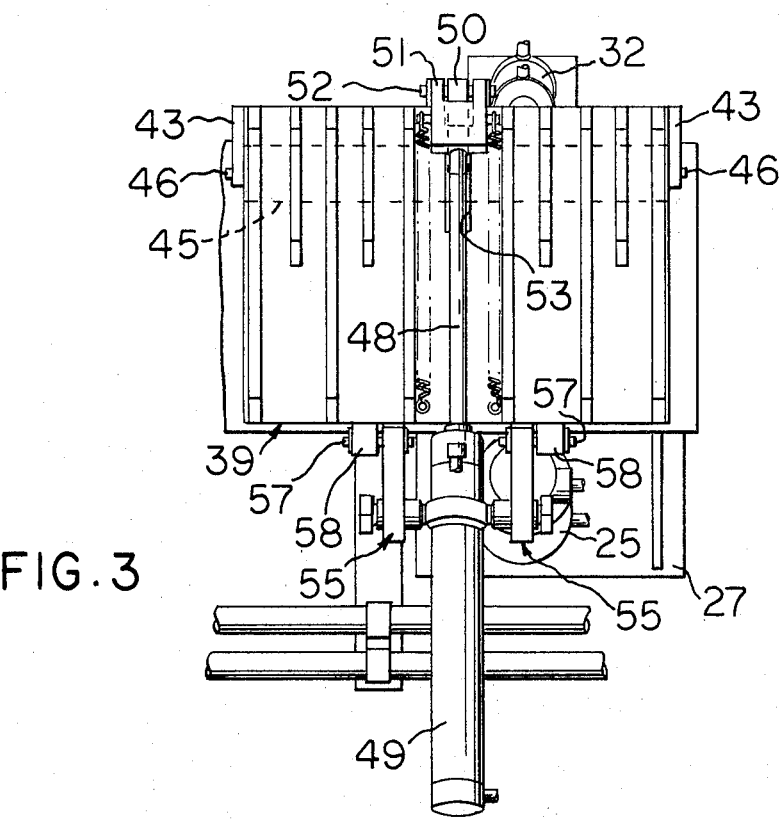
FIGURE 3 is a top plan view of a portion of the furnace of FIGURE 1.
Figure 4:
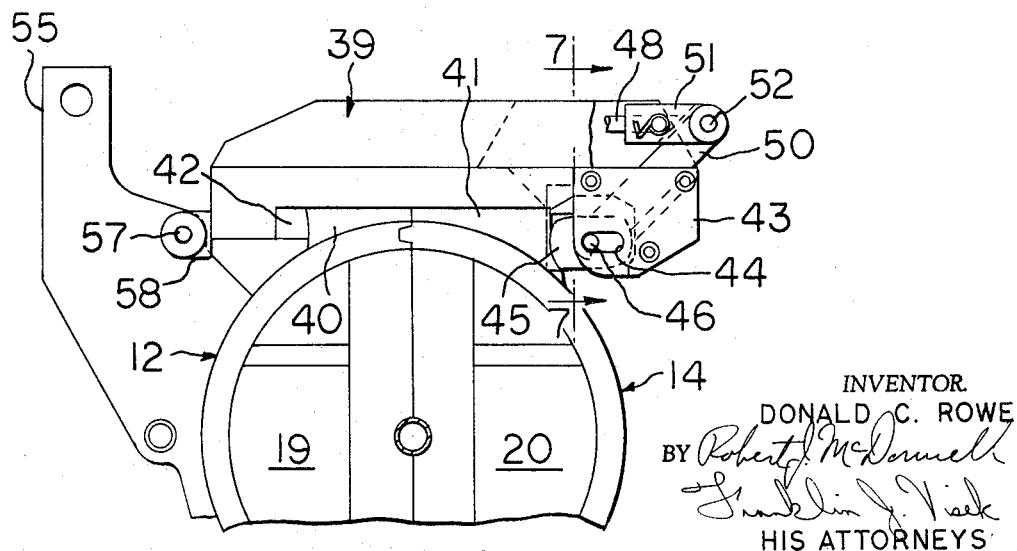
FIGURE 4 is an enlarged end elevational view of a portion of the furnace of FIGURE 2 with the clamping structure in a closed position.

Referring to the drawings and particularly FIGURES 1 to 3, there is shown the furnace of the present invention including a support 10 having a base 11 upon which is pivotally mounted a pair of cooperating metallic shells 12 and 14. The shell 12 is pivotally connected through an ear 15 on the shell 12 to a pair of upstanding lugs 16 on the base 11 of the support 10 by a pin 16a, which passes through aligned bores in the ear 15 and the lugs 16. Similarly, the shell 14 is pivotally connected to the support 10 through an ear 17 on the shell 14 to a pair of cooperating lugs 18 on the base 11 by a pin 18a, which passes through aligned bores in the ear 17 and the lugs 18.

The semi-cylindrical shell 12 has a plate 19 at each end thereof and the shell 14 has similar end plates 20. Each of the end plates 19 has a plurality of projections 21 (see FIGURE 6) extending therefrom for positioning in a plurality of cooperating grooves 22 in the end plates 20. The projections 21 and the grooves 22 are employed to insure longitudinal alignment of the shells 12 and 14 when they are pivotally moved to their closed position.

Additionally, the shell 12 has a groove 23 in its uppermost portion for receipt of a projection 24, which extends from the uppermost portion of the shell 14. The groove 23 and the projection 24 extend the length of the shells 12 and 14, respectively, to insure proper mating of the shells when they are moved to their closed position and also to insure that one shell is not driven past the mating position before the other shell completely reaches the mating position.

Figure 6:
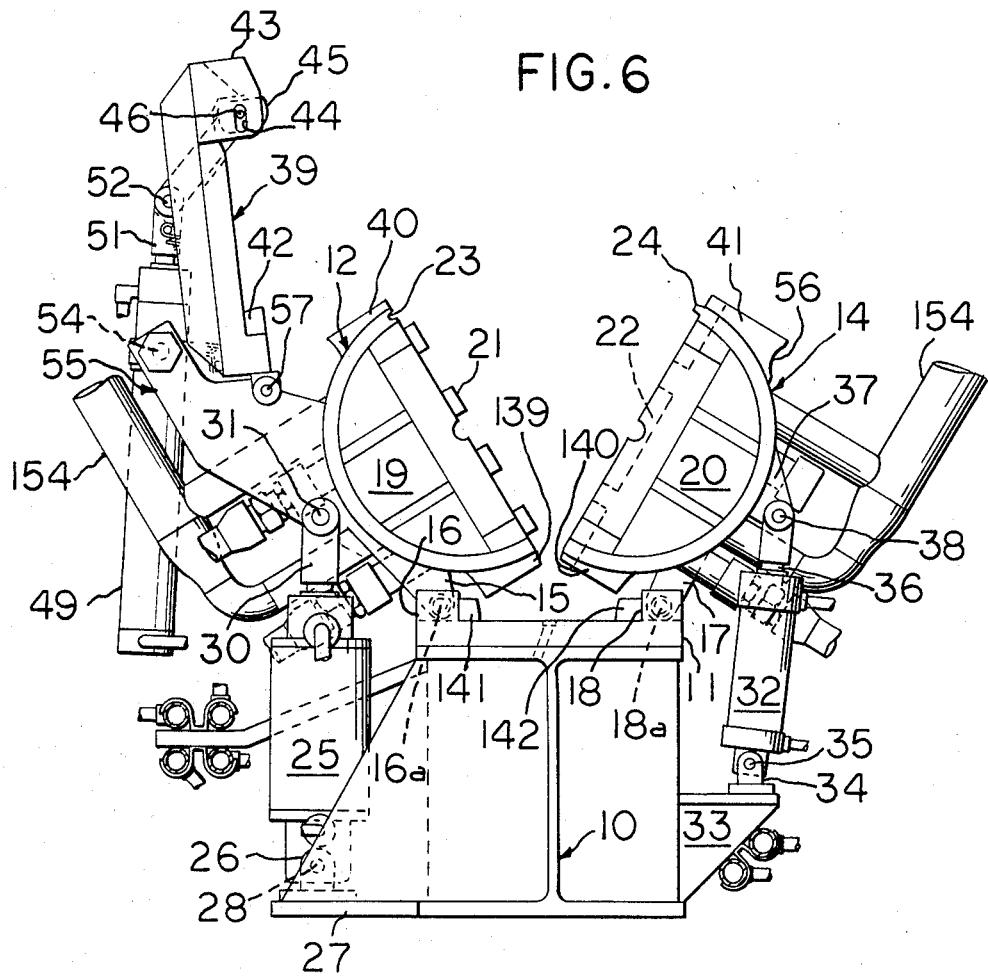
FIGURE 6 is an end elevational view of the furnace, similar to FIGURE 2, with the furnace in an open position.

As shown in FIGURES 2 and 6, the shells 12 and 14 have downwardly projecting portions 139 and 140, respectively, in abutting relation with each other. The portions 139 and 140 have slotted mating surfaces to allow rotational movement of the shells 12 and 14.

The portions 139 and 140 have arcuate surfaces, which are remote from the mating surfaces, for cooperation with raised members 141 and 142, respectively, on the base 11 when the shells 12 and 14 are in their closed position. This arrangement insures that the bottom portions of the shells 12 and 14 are held in a fixed relationship in their closed position.

The shell 12 is rotated from its closed position to an open position by a pair of hydraulic actuators 25. Each of the hydraulic actuators 25 is pivotally connected to a projecting base 27 on the support 10 through upstanding lugs 26 on the base 27 and a pin 28. Each of the hydraulic actuators 25 has an actuating member or rod 29 extending therefrom and connected to a portion of the ear 15 through a bifurcated member 30 and a pin 31. Thus, whenever the hydraulic actuators 25 are energized to move the actuating member 29 into the actuator 25, the metallic shell 12 is rotated counter-clockwise (as view in FIGURE 2) about the pin 16a.

The metallic shell 14 is rotated about the pin 18a from its closed position to an open position and vice versa by a pair of hydraulic actuators 32. Each of the hydraulic actuators 32 is pivotally connected to the support 10 through a pair of upstanding lugs 34 on a projecting base 33, which is secured to the support 10, and a pin 35.

Each of the hydraulic actuators 32 has an actuating member or rod 36, which may be moved toward and away from the actuator 32. The actuating member 36 is pivotally connected to a pair of lugs 37, which are secured to the shell 14, through a pin 38. When the hydraulic actuators 32 are energized to retract the actuating members 36 into the actuators 32, the shell 14 is moved from its closed position towards an open position by pivoting clockwise (as viewed in FIGURE 2) about the pin 18a.

The metallic shells 12 and 14 are held in their closed position by a clamping member 39. As shown in FIGURE 2, the clamping member 39 fits snugly against a projection 40 on the metallic shell 12 and a projection 41 on the metallic shell 14. The clamping member 39 includes an abutting member 42 engaging against one side of the projection 40.

The clamping member 39 has a pair of depending brackets 43 on opposite ends thereof with slots 44 therein. A cam 45 is mounted between the depending brackets 43 through extending pins 46, which ride in the slots 44. As shown in FIGURE 2, the cam 45 is disposed between the projection 41 of the shell 14 and a depending flange 47 of the clamping member 39. Accordingly, the cam 45 functions to permit the clamping member 39 to lock the metallic shells 12 and 14 in their closed position.

Figure 7:
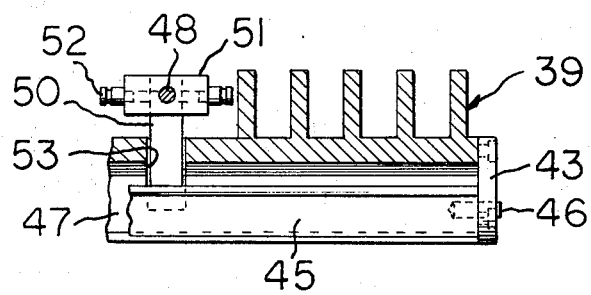
FIGURE 7 is a sectional view taken along the line 7—7 of FIGURE 4.

The cam 45 is connected to an actuating rod 48 of a hydraulic actuator 49 through an arm 50. The arm 50 is pivotally connected to a bifurcated bracket 51, which is mounted on the end of the actuating rod 48, through a pin 52. The arm 50 moves through a slot 53 (see FIGURES 3 and 7) in the clamping member 39 to permit relative movement of the cam 45 with respect to the clamping member 39. It should be understood that a plurality of clamping members 39 is disposed along the metallic shells 12 and 14 with each of the clamping members 39 having its own hydraulic actuator 49.

The hydraulic actuator 49 is pivotally mounted by a pin 54 on a pair of brackets 55, which are secured to the metallic shell 12. Each of the brackets 55 on the outermost ends of the exterior clamping members 39 includes the ear 15, which has the hydraulic actuator 25 and the upstanding lugs 16 pivotally connected thereto.

As shown in FIGURE 2, the bases 27 extend further on the left side of the furnace than the bases 33 do on the right side since the bases 27 must support the clamping members 39, the hydraulic actuators 49, and the cooperating parts in addition to the shell 12 and its actuating mechainsms. The bases 33 only support the shell 14 and its actuating mechanisms.

With the clamping members 39 in the position shown in FIGURE 2 wherein the shells 12 and 14 are held in their closed position, energization of the hydraulic actuators 49 retracts the actuating rods 48 within the hydraulic actuators 49. The retraction of each of the actuating rods 48 causes the cam 45 to pivot about the pins 46 to rotate the cam 45 away from contact with the projection 41. It should be noted that the projection 41 has a curved portion 56 (see FIGURE 5) for cooperation with the cam 45.

When the cam 45 moves away from the projection 41, the pins 46 slide along the slots 44 in the brackets 43 until the cam 45 engages the flange 47. Further continued retraction of the actuating rod 48 after the cam 45 has abutted against the flange 47 results in the clamping member 39 pivoting about pins 57, which pivotally connect the clamping member 39 to the brackets 55 through lugs 58 (see FIGURES 1 and 3) on the clamping member 39. The hydraulic actuator 49 also pivots about the pins 54 at the same time so that the clamping member 39 is moved to the open position shown in FIGURE 5.

Figure 5:
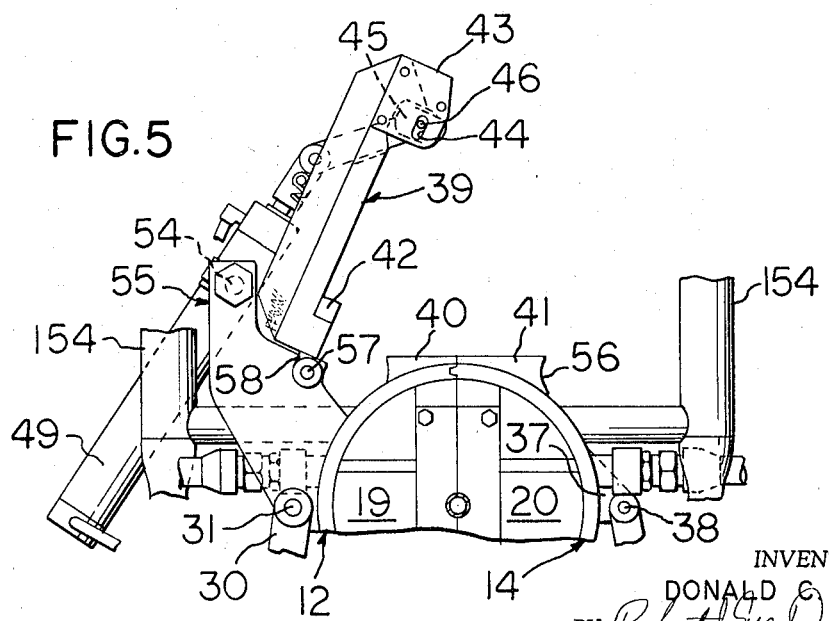
FIGURE 5 is an end elevational view of a portion of the furnace with the clamping structure in an open position.

After the clamping members 39 have been moved to their open position of FIGURE 5, the hydraulic actuators 25 and 32 are energized to rotate the shells 12 and 14 to their open position. When this occurs, the clamping members 39 and the hydraulic actuators 49 rotate to the position shown in FIGURE 6. The open position of the shells 12 and 14 also is shown in FIGURE 6. It should be understood that the detailed description of hydraulic actuators is illustrative only and that mechanical linkage arrangements may be substituted for the hydraulic linkages without involving more than the substitution of equivalent components.

Each of the metallic shells 12 and 14 has a plurality of ceramic members 59 mounted therein. One of the clamping members 39 is associated with the adjacent ceramic members 59 in the shells 12 and 14. As shown in FIGURES 8 and 9, the ceramic member 59 is secured to the metallic shell 12 through a connector including a cap member 60, which is adapted to readily receive a bolt 61. The cap member 60 is embedded in the ceramic member 59. The other end of the bolt 61 is held by nuts 62, which are secured to the bolt 61 on the exterior of the shell 12. Thus, the ceramic members 59 may be easily removed from the metallic shell whenever necessary such as if the block should crack, for example. It should be understood that the ceramic members 59 are secured to the shell 14 by the same structure.

As shown in FIGURES 8 and 9, the ceramic members 59 in the shells 12 and 14 have a cavity therebetween to form a heating chamber. The specific shape of the cavity or heating chamber is dependent on the desired configuration of the part, which is to be disposed within the heating chamber. Thus, in forming a rotor blade spar, it is desired that one end, which is the root end, of the heating chamber be circular in cross-section while the other end is D-shape in cross-section. This difference is clearly shown in FIGURES 8 and 9. It should be understood that the contour of the heating chamber is drawn to very specific tolerances as this contour, which functions as die members, permits the spar to be finished to the desired close tolerance.

Each of the ceramic members 59 in the shell 12 has a plurality of passages 63–70 extending therethrough. Electrical heating coils 137 are disposed in each of the passages 63–70 for supplying heat to the heating chamber. The coils 137 are helically wound and approximately the same diameter as the passages 63–70. The passages 63–70 function as a common conduit for both an inlet system and an exhaust system for the distribution of an inert liquid such as nitrogen to the heating chamber.

Figure 14:
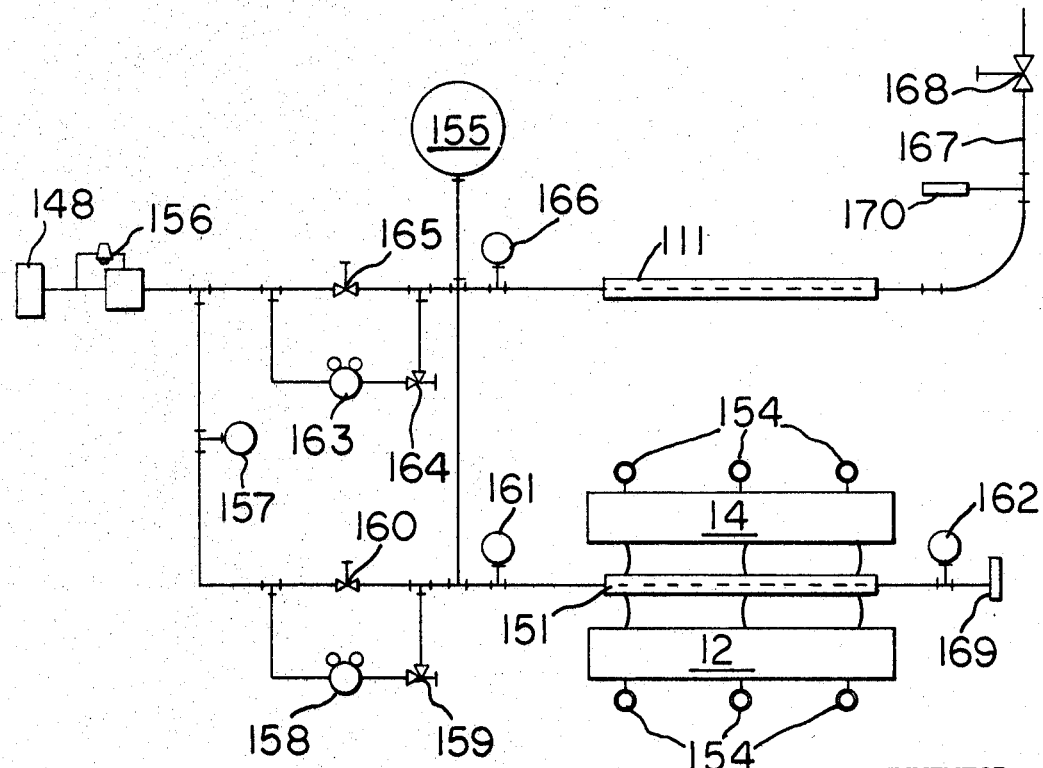
FIGURE 14 is a schematic view of the nitrogen supply and exhaust system.

The passages 63–70 are connected at intervals to inlet manifolds 71 and 72, which are spaced along the ceramic members 59 and in communication with a nitrogen supply source 148 (see FIGURE 14). The manifolds 71 and 72 are connected through passages in the shell 12 to flexible hoses 149 and 150, respectively. The hoses 149 and 150 communicate with an intake manifold 151, which is connected to the nitrogen supply source 148.

As shown in FIGURE 14, the nitrogen flows toward the manifold 151 from the source 148 through a pressure regulator 156 and past a pressure gauge 157. The nitrogen then can either flow through a pressure regulator 158 or by-pass the regulator 158 depending upon whether an angle valve 159 in the by-pass line containing the regulator 158 or an angle valve 160 in the main line is open. The nitrogen then flows past a pressure gauge 161 to enter the manifold 151, which has a pressure gauge 162 and a 500 p.s.i. relief valve 169 at its terminal end.

The pressure regulator 156 maintains the pressure of the nitrogen at 2600 p.s.i. while the regulator 158 sets the pressure at 1000 p.s.i. The gauge 157 reads pressures to 2500 p.s.i., the guage 161 indicates pressures to 1000 p.s.i., and the gauge 162 has a maximum of 100 p.s.i.

Each of the manifolds 71 is connected to a chamber 73, which extends throughout the ceramic members 59 and has pairs of passages 74 and 75 radiating therefrom at substantially the same spaced intervals as the manifolds 71.

The passage 74 connects the chamber 73 with the passage 63 while the passage 75 connects the chamber 73 with the passage 65. Passages 76, which are disposed at substantially the same spaced intervals as the manifolds 71, connect the passages 63 with the passage 64. Similarly, passages 77, which are positioned at substantially the same spaced intervals as the manifolds 71, provide communication between the passage 65 and the passage 66.

Each of the inlet manifolds 72 communicates with a chamber 78, which extends throughout the ceramic members 59 and has pairs of passages 79 and 80 radiating therefrom at substantially the same spaced intervals as the manifolds 72. The passages 79 provide communication from the chamber 78 to the passage 67 while the passages 80 connect the chamber 78 with the passage 69. The passage 67 is connected to the passage 68 by passages 81 while the passage 69 communicates with the passage 70 through passages 82. The passages 81 and 82 are positioned in the ceramic members 59 at substantially the same spaced intervals as the intake manifolds 72.

The passages 63–70 communicate with the heating chamber through a plurality of passages or ports 83–90, respectively. The ports 83–90 are spaced at substantially the same intervals as the intake manifolds 71 and 72. Thus, the nitrogen or other inert fluid flows from the source 148 into the interior of the heating cavity through the passages 83–90 to provide an inert atmosphere in the heating chamber whenever the heating chamber is being heated.

The ceramic members 59 also have an exhaust system for the nitrogen fluid therein. As shown in FIGURE 9, the passages 63–70 also form a part of the exhaust system.

The exhaust system includes exhaust manifolds 91 and 92, which are connected to chambers 93 and 94, respectively. The chambers 93 and 94 extend throughout the ceramic members 59 in the same manner as the chambers 73 and 78 for the inlet system while the manifolds 91 and 92 are positioned at spaced intervals.

The exhaust manifolds 91 and 92 are connected through passages in the shell 12 to exhaust pipes 152 and 153, respectively. The pipes 152 and 153 are connected to an exhaust stack 154 (see FIGURE 2), which vents the nitrogen to the atmosphere. It should be understood that each of the ceramic members 59 has a similar arrangement. A valve (not shown) in the exhaust stack 154 is employed to close the exhaust system when desired.

The chamber 93 has passages 95 and 96, which radiate therefrom in substantially the same spaced relation as the manifolds 91, for connection with the passages 64 and 66, respectively. The passage 64 communicates with the passage 63 through passages 97 and the passage 66 communicates with the passage 65 through passages 98. The passages 97 and 98 are positioned at substantially the same spaced intervals as the manifold 91.

The chamber 94 has passages 99 and 100, which radiate therefrom in substantially the same spaced relation as the manifolds 92, connecting the chamber 94 with the passages 68 and 70, respectively. The passage 68 communicates with the passage 67 through passages 101 while the passage 70 communicates with the passage 69 through passages 102. The passages 101 and 102 are disposed at substantially the same spaced intervals as the manifolds 92.

The passages 63–70 communicate with the heating chamber through exhaust passages 103–110, respectively. The exhaust passages 103–110 are positioned in substantially the same spaced relation as the manifolds 91 and 92. Thus, the nitrogen or other inert fluid may be exhausted from the heating chamber through the passages 103–110. However, it should be understood that the exhaust manifolds 91 and 92 communicate with the atmosphere only when cooling of the heating chamber is desired. When the heating chamber is being heated, the exhaust manifolds 91 and 92 are prevented from exhausting nitrogen from the heating chamber by closing the valves (not shown) in the exhaust stacks 154.

It should be understood that the ceramic members 59, which are mounted in the metallic shell 14, include a similar arrangement of inlet and exhaust passages for the inert fluid, which is preferably nitrogen. The circulation of flow for cooling the heating chamber is such that the nitrogen, which enters through the passages in the ceramic members 59 in the metalilc shell 12, primarily returns through the passages in the ceramic members 59 in the metallic shell 12. This is because the hollow part, which is mounted within the heating chamber, is forced into engagement with the interior walls of the ceramic members 59 prior to any cooling.

It should be understood that if any of the passages 63–70, the interconnecting passages 76, 77, 81, 82, 97, 98, 101, and 102, the inlet passages 83–90, or the exhaust passages 103–110 become clogged, the intake and exhaust systems would adjust to permit continued supply of nitrogen to the heating chamber without significantly disrupting the operation.

As previously mentioned, the interior walls of the ceramic members 59 are designed to cooperate with a spar 111 (see FIGURE 12), which forms the base of a helicopter rotor blade. The root end of the spar is annular in cross section while the other end has a D-shaped cross section. It should be understood that any type of hollow part could be utilized in the furnace of the present invention whenever it is desired to heat-treat, form, or temper the part or perform all of the various steps. Of course, the contour of the inner walls of the ceramic members 59 must be changed to meet the specific shape of the hollow part.

Figure 12:
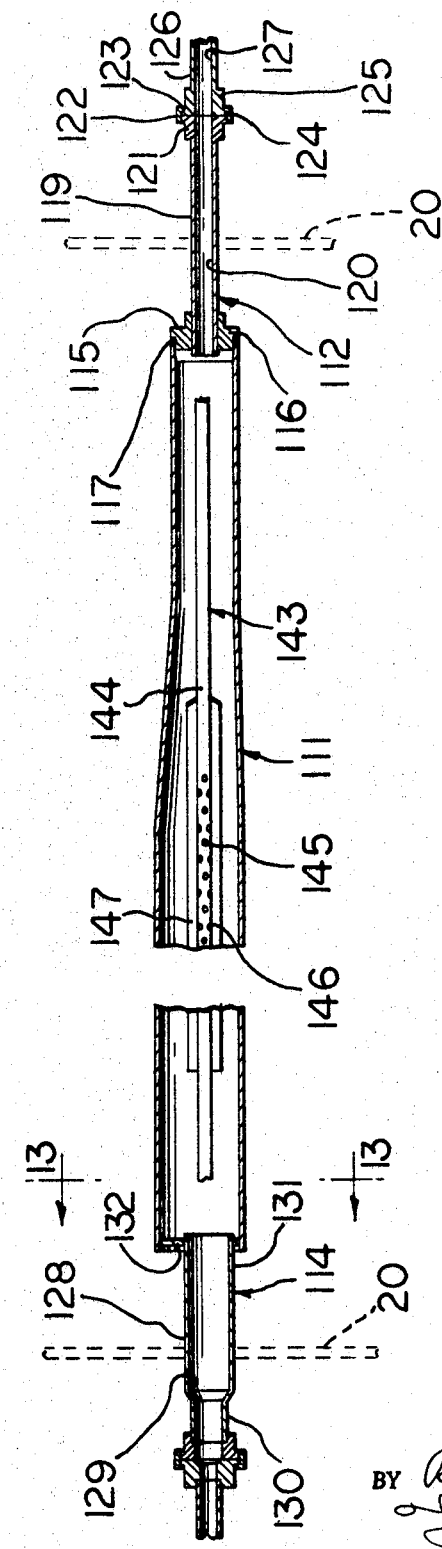
FIGURE 12 is a sectional view of the spar with the adapters that support the spar attached thereto and further disclosing an inner gas diffuser within the spar.

As shown in FIGURE 12, the spar 111 is supported within the heating chamber of the furnace by support member 112 and 114. The support member 112 is adapted to support the root end, which is of annular cross section, while the support member 114 is adapted to support the end of the spar, which has a D-shaped cross section.

The support member 112 includes a member 115, which is threadedly connected to threads on the interior of the root end of the spar 111. The member 115 has a flange 116, which seals against a gasket 117 to provide a seal between the member 115 and the root end of the spar 111.

The member 115 is secured by welding or the like to a hollow pipe 119, which extends through a bore in the member 115 so that a passage 120 is in communication with the interior of the spar 111. The hollow pipe 119 extends through openings in the end plates 19 and 20 of the metallic shells 12 and 14, respectively. When the shells 12 and 14 are in their closed position, the end plates 19 and 20 fit tightly against the hollow pipe 119. Suitable seals (not shown) are employed to aid in providing the tight fit.

The hollow pipe 119 has an enlarged head 121, which is threadedly connected to a nut 122. The nut 122 includes a flange 123, which contacts a flange 124 of an enlarged head 125 of a hollow pipe 126 to connect the hollow pipe 119 and the hollow pipe 126. The hollow pipe 126 has a passage 127 for communication with the passage 120. Thus, it is seen that a passage is provided to the interior of the spar 111 through the support member 112. The hollow pipe 126 is connected to the source 148 of inert fluid, such as nitrogen, for supply to the interior of the spar 111.

The nitrogen flows toward the passage 127 in the pipe 126 through the regulator 156 (see FIGURE 14). The nitrogen then can either flow through a pressure regulator 163 or by-pass the regulator 163 depending upon whether an angle valve 164 in the by-pass line containing the regulator 163 or an angle valve 165 in the main line is open. The nitrogen then flows past a connection to a vacuum pump 155 and a pressure gauge 166 to the passage 127 in the pipe 126.

The regulator 163 maintains the pressure at 1000 p.s.i. and the gauge 166 indicates a maximum reading of 1000 p.s.i. It should be noted that the vacuum pump 155 also is connected to the line supplying nitrogen to the manifold 151.

Figure 13:
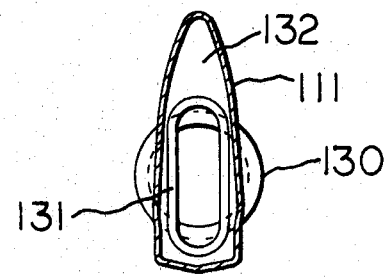
FIGURE 13 is a sectional view taken along the line 13—13 of FIGURE 12.

The support member 114 includes a hollow pipe 128 having a passage 129 extending therethrough. The hollow pipe 128 has a first portion 130 with a circular periphery and a second portion 131 with an oval periphery as clearly shown in FIGURE 13. The circular portion 130 extends through the openings in the end plates 19 and 20 of the metallic shells 12 and 14, respectively. When the shells 12 and 14 are in their closed position, the end plates 19 and 20 fit tightly against the portion 130 of the hollow pipe 128. Suitable seals (not shown) are employed to aid in providing the tight fit.

The hollow pipe 128 is secured to the spar 111 by a plate 132. The plate 132 is welded to the oval portion 131 of the hollow pipe 128 and to a waste end portion of the spar 111. In order to remove the support member 114 from the spar 111, it is necessary to cut off the waste end portion of the spar 111. However, this waste end portion, which remains secured to the plate 132, may then be secured to the waste end portion of another spar, which is to be placed within the heating chamber of the furnace. Thus, the support member 114 may be employed a plurality of times before it must be discarded. Of course, the support member 112 may be used repeatedly since it is threadedly connected to the spar 111.

The passage 129 in the hollow pipe 128 provides communication from the interior of the spar to the exterior of the furnace. The circular portion 130 of the pipe 128 is connected to the atmosphere through an exhaust stack 167 (see FIGURE 14), which has a valve 168 controlling flow therethrough, so as to allow the nitrogen, which enters the interior of the spar 111 through the support member 112, to pass from the spar. The stack 167 also has a relief valve 170 therein. It should be understood that the fluid flow through the interior of the spar 111 could be in the reverse direction, if desired.

With the use of liquid nitrogen as the fluid passing through the interior of the spar 111, it is desirable to obtain as much diffusion of the nitrogen, when it is used for cooling purposes, within the interior of the spar 111. Accordingly, a diffuser 143 is mounted within the interior of the spar 111 and includes a cylindrical member 144 with a plurality of openings 145 therein to diffuse the inert fluid.

If desired, the openings 145 may be directed at an angle with respect to the radius of the cylindrical member 144 to provide a swirl effect so as to increase the cooling effect of the nitrogen. It should be understood that the nitrogen is in a gaseous state by the time that it passes through the openings 145.

The diffuser 143 is preferably supported by the support members 112 and 114 so that the only diametrically opposed stiffeners 146 and 147 are required to prevent the member 144 from bending or becoming arcuate. If the diffuser 143 is not supported by the support member 114, suitable support structure (not shown) must be employed at the end of the member 144 adjacent the end of the spar 111 closest to the support member 114.

Figure 10:
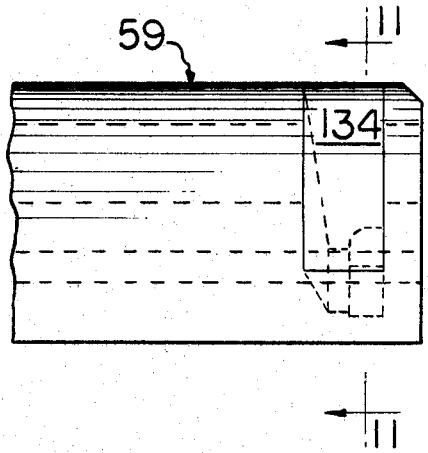
FIGURE 10 is a side elevational view of a portion of a ceramic member showing an insert.
Figure 11:
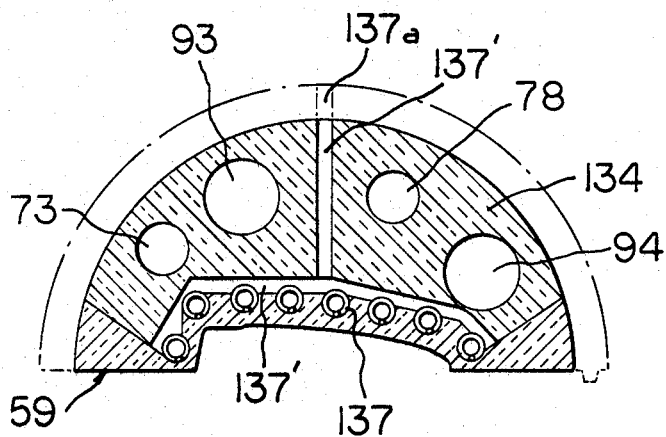
FIGURE 11 is a sectional view taken along the line 11—11 of FIGURE 10.

Each of the ceramic members 59 has a grooved area at each end to provide communication between the passages 63–70 and the exterior of the furnace. A mating ceramic member 134 is adapted to be inserted in each of the grooved areas and is shown disposed therein in FIGURES 10 and 11. The member 134 has passages 137' therein for electrical connections to the heating coils 137 in the passages 63–70. However, inert fluid cannot escape from the passages 63–70 to the exterior of the ceramic members 59. The electrical connections then pass from the ceramic members 134 to the exterior of the shells 12 and 14 through suitable openings 137a in the shells. Thus, the heat of the coils 137 in the passages 63–70 may be appropriately controlled from a console.

The control of the heating coils 137 depends upon the temperature in the heating chamber. Accordingly, it is necessary to employ a plurality of thermocouples 138 or the like to obtain the temperature in various portions of the heating chamber. The thermocouples 138 are disposed in passages 135 and 136 (see FIGURES 8 and 9) at spaced intervals. The thermocouples 138, which are spring loaded to permit them to be withdrawn from the passages 135 and 136 and to maintain them in contact with the spar 111 when in the passages 135 and 136, extend from the passages 135 and 136 through suitable openings in the metallic shells 12 and 14 to the console where the temperature in the heating chamber is indicated and recorded.

The operation of the furnace of the present invention will be described with respect to heat-treating, forming, and tempering the spar 111 when it is made of 4340 steel. It should be understood that the furnace of the present invention is adapted for use with any hollow part, which may be made of any material, on which it is desired to perform any or all of the steps of heat-treating, forming, and tempering.

The spar 111 is first connected to the support member 112 by threading the member 115 into the interior of the spar 111 and by welding the plate 132 of the support member 114 to the spar. With the spar 111 supported on the support members 112 and 114, the metallic shells 12 and 14 are moved to their closed position by the hydraulic actuators 25 and 32, respectively.

The clamping members 39 are then rotated by the hydraulic actuators 49 to hold the metallic shells 12 and 14 in their closed position. As each of the clamping members 39 moves to the position in which it retains the metallic shells 12 and 14 in their closed positions, the abutting portion 42 engages the projection 40 of the metallic shell 12. Further movement of the actuating rod 48 of the hydraulic actuator 49 causes the cam 45 to coat with the depending flange 47 of the clamping member 39 and the projection 41 of the metallic shell 14 to lock the shells 12 and 14 in their closed position.

With the metallic shells 12 and 14 in their closed and locked positions, the heating chamber is formed between the ceramic members 59. The ends of the heating chamber are closed by the end plates 19 and 20 of the metallic shells 12 and 14. The end plates 19 and 20 fit tightly against the support members 112 and 114.

The ports 83–90 and 103–110 are connected to the vacuum pump 155 (see FIGURE 14), which removes the normal atmosphere from within the heating chamber. The angle valves 159 and 160 and the exhaust valves (not shown) in the exhaust stacks 154 are closed during this purging operation. Similarly, the interior of the spar 111 is connected to the vacuum pump 155 through the passages in the support member 112 to evacuate the normal atmosphere from the interior of the spar 111. The angle valves 164 and 165 and the exhaust valve 168 are closed during this purging operation. Thus, the atmosphere surrounding both the interior and the exterior of the spar 111 is exhausted.

An inert fluid such as nitrogen, for example, is then supplied through the inlet passages or ports 83–90 to the heating chamber. The nitrogen is forced through the various passages under a controlled pressure of about 100 p.s.i. The nitrogen continuously flows through the inlet passages 83–90 to maintain an inert atmosphere in the heating chamber. The continuous flow is to replace any loss in the heating chamber due to leaks. Of course, at this time, the exhaust manifolds 91 and 92 are prevented from exhausting nitrogen from the heating chamber by leaving the valves (not shown) in the exhaust stacks 154 closed. The nitrogen provides a non-oxidizing atmosphere to minimize the formation of scale and discoloration on the surface of the spar 111. This scale and discoloration occurs in a normal atmosphere at the high temperatures to which the spar 111 is subjected.

With the spar 111 surrounded by an atmosphere of nitrogen or other inert fluid, the electrical heating elements or coils 137 are now supplied with sufficient voltage to heat the heating chamber to a temperature, which will raise the temperature of the spar 111 to above the critical temperature of the material, which is 4340 steel in the present example. The critical temperature of 4340 steel is approximately 1400° F.

The temperature of the heating chamber is increased in about 30 minutes so that the temperature of the spar reaches about 1500° F. During the next ten minutes, the peak temperature is retained above 1400° F. In this ten minute span, the steel will completely transform to an austenitic structure whereby the material becomes easily deformable.

The temperature of the heating chamber is measured by the thermocouples 138 and recorded at the console. The console controls are adjusted to maintain the electrical heating elements 137 at the required voltage so that the temperature of the spar 111 does not fall below 1430° F. during the ten minute span.

After the temperature of the spar has been maintained at the temperature greater than 1430° F. for about nine minutes, an inert fluid such as nitrogen, for example, is supplied to the interior of the spar 111 at a very high pressure so as to maintain an internal pressure of about 1000 p.s.i. within the spar 111. This is accomplished by the valve 164 being opened and the valve 165 closed so that the regulator 163 maintains the desired pressure. Of course, the passage 129 in the support member 114 is not connected to the atomsphere through the exhaust stack 167 since the valve 168 is closed. Thus, the nitrogen is able to build up sufficient pressure within the spar 111 as it flows thereinto from the hollow passages 127 and 120 within the support member 112.

This high internal pressure forces the spar 111 against the internal walls of the ceramic members 59 to impart the desired dimensional characteristics to the spar 111. Thus, by specifically forming the contours of the interior walls of the ceramic members 59, it is possible to manufacture the spar 111 within very close tolerances. The high pressure of about 1000 p.s.i. is maintained within the interior of the spar 111 for approximately one minute to complete the forming operation.

With the completion of the forming operation, the heating elements 137 are de-energized. Simultaneously, the interior of the spar 111 is vented through the passage 129 in the support member 114 by opening the exhaust valve 168 and the exhaust manifolds 91 and 92 are connected to the atmosphere by opening the valves (not shown) in the exhaust stacks 154.

The nitrogen is forced through the inlet passages 83–90 into the heating chamber and thence through the exhaust passages 103–110 at a sufficient velocity and in sufficient quantity to rapidly cool the spar 111. It should be understood that some of the nitrogen may flow from the intake manifolds 71 and 72 to the exhaust manifolds 91 and 92 through the common passages 63–70. However, this presents no problem as there is still sufficient flow through the inlet ports 83–90 to the heating chamber and from the exhaust ports 103–110 to provide sufficient nitrogen flow across the spar 111 to cool it rapidly. The nitrogen also is forced through the interior of the spar 111 at the same time to aid in cooling the spar rapidly.

It is desired that the 4340 steel be transformed from an austenitic state to a martensitic state without sufficient formation of undesirable microstructures such as ferrite and pearlie, for example. These are crystalline structures within the material and result from a quenching that is not sufficiently rapid. Accordingly, if 4340 steel is to transform from an austenitic state to a martensitic state, it is necessary that it be cooled to approximately 500° F. within approximately 20 seconds. This rapid quenching of the spar is what prevents the formation of the undesirable microstructures. By transforming from the austenitic state to the martensitic state, the material retains the desired metallurgical properies such as hardness and strength. The thermocouples 138 indicate on the console that the temperature within the heating chamber has decreased sufficiently to produce the desired result.

As soon as the temperature in the heating chamber is at the desired temperature, the rapid circulation of the nitrogen is stopped by closing the valves (not shown) in the exhaust stacks 154 to prevent flow through the exhaust manifolds 91 and 92. Similarly, the flow of nitrogen through the passage 129 in the support member 114 is stopped by closing the exhaust valve 168. However, nitrogen is still supplied through the inlet ports 83–90 to the heating chamber to provide the inert atmosphere in the same manner as when the spar 111 was being heated to a temperature above its critical temperature. Thus, the nitrogen is maintained at a pressure of about 100 p.s.i. in the heating chamber and there is a continuous flow to minimize leaks, etc.

The heating elements 137 are then re-energized so as to heat the spar 111 to approximately 1000° F. This requires about thirty minutes and the temperature is recorded at the console through the means of the thermocouples 138. The appropriate voltage is supplied to the heating elements 137 to maintain the temperature of 1000° F. for approximately five minutes to temper the spar 111. Of course, the specific tempering temperature is dependent upon the material. The tempering is employed to increase the ductility of the spar 111 as the rapid quenching to the martensitic state produces a hard but brittle structure.

Thereafter, the spar 111 is cooled as rapidly as practical. First, the heating elements 137 are de-energized to prevent the supply of further heat to the heating chamber. Thereafter, the spar 111 may be cooled as desired and the forced circulation of nitrogen in the same manner as for cooling after heat-treating may be employed if desired. However, this type of forced circulation is not requisite after tempering since the length of the cooling period is unimportant insofar as affecting the structural characteristics of the material after the tempering cycle. Of course, the forced cooling enables more products to be produced in the same period of time; thus, this is the desired manner of cooling. The forced circulation of the nitrogen may be employed not only around the exterior of the spar 111 but through the interior of the spar 111 if desired. Obviously, the supply of nitrogen through the interior of the spar 111 decreases the time required for cooling.

When the thermocouples 138 indicate that the heating chamber is at a temperature whereby the spar temperature is below 250° F., the flow of nitrogen from the source 148 is stopped by closing the valve 159 and 164. Then, the furnace is opened by first actuating the hydraulic actuators 49 to remove the clamping members 39 from locking the metallic shells 12 and 14 in their closed position. Thereafter, the hydraulic actuators 25 and 32 are energized to rotate the shells 12 and 14 to their open position as shown in FIGURE 6.

The support member 112 is then unthreaded from the spar 111 and the support member 114 is disconnected from the spar 111 by cutting a waste end of the spar 111 as previously mentioned. The spar 111 is then free for removal from the furnace. Another specimen may then be placed within the furnace and the process repeated.

It should be understood that the furnace may be employed to merely heat-treat and form a material if the material does not require tempering. Thus, the material would first be heated to a high temperature at which it would be deformable so that the various materials or alloys would be in solution. Thereafter, an internal pressure could be applied to the hollow part and expand it into engagement with the ceramic walls. It should be observed that the support members 112 and 114 cooperate with the spar 111 of any other hollow part in such a way as to provide a sealed interior whereby the desired internal pressure may be obtained. Of course, even if a material did not require tempering, it is desirable that it be heated to its deformable temperature in a non-oxidizing atmosphere so that there is no formation of scale, etc. during the heating process.

While each of the shells 12 and 14 is shown with three ceramic members 39, it should be understood that any number of ceramic members 59 may be employed depending upon the length of the hollow part, which is to be fabricated in the furnace. Each of the ceramic members 59 serves a plurality of purposes. Each member 59 contains the precise contour of the spar 111 at the elevated temperature and passages for the inert fluid, functions as an enclosure for the heating elements 137, and acts as an insulator.

An advantage of this invention is that it requires only a single structure to heat-treat the material, form the material to the desired shape, and quench the material in a controlled atmosphere. Another advantage of this invention is that it reduces the cost of producing the spar, which forms the base support of the helicopter rotor blade, while creating a more uniform product. Another advantage of this invention is that the vibrations of the helicopter, which have the spars formed by the present invention as part of their rotor blades, are reduced because of the greater dimensional accuracy due to the closer tolerances resulting from use of the furnace of the present invention.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A process for forming a hollow part comprising the steps of heating the part until the material of the part is readily deformable, maintaining an inert atmosphere about the part when it is heated, supplying high pressure fluid to the interior of the part when the material is deformable to form the part to its desired shape, and cooling the part rapidly after it has been formed to its desired shape.

2. A process for forming a hollow part comprising the steps of heating the part until the material of the part is readily deformable, maintaining an atmosphere of nitrogen about the part when it is heated, supplying nitrogen to the interior of the part when the material is deformable to apply a pressure of about 1000 p.s.i. to form the part to its desired shape, and cooling the part rapidly after it has been formed to its desired shape.

3. A process for heat-treating, forming, and tempering a hollow part of a ferrous material comprising the steps of heating the part in an inert atmosphere to a predetermined temperature above its critical temperature to render the material austenitic, supplying fluid pressure for a predetermined period to the interior of the hollow part after the predetermined temperature is reached to form the part, cooling the part rapidly to transform the material from an austenitic state to a martensitic state, heating the part to a second predetermined temperature below the critical temperature to temper it, and again cooling the part.

4. A process for heat-treating, forming, and tempering a hollow part of a ferrous material comprising the steps of heating the part in an atmosphere of nitrogen to a predetermined temperature above its critical temperature to render the material austenitic, supplying fluid pressure for a predetermined period to the interior of the hollow part after the predetermined temperatures is reached to form the part, cooling the part rapidly to transform the material from an austenitic state to a martensitic state, heating the part to a second predetermined temperature below the critical temperature to temper it, and again cooling the part.

5. A process for heat-treating, forming, and tempering a hollow part of a ferrous material comprising the steps of heating the part in an inert atmosphere to a predetermined temperature above its critical temperature to render the material austenitic, supplying fluid pressure for a predetermined period to the interior of the hollow part after the predetermined temperature is reached to form the part, directing an inert fluid over the part to cool the part rapidly to transform the material from an austenitic state to a martensitic state, heating the part to a second predetermined temperature below the critical temperature to temper it, and again cooling the part.

6. A process for heat-treating, forming, and tempering a hollow part of 4340 steel comprising the steps of heating the part to a temperature of approximately 1500° F. and maintaining the temperature above 1400° F. for approximately ten minutes, maintaining an inert atmosphere about the part during heating of the part, applying a pressure of approximately 1000 p.s.i. to the interior of the part for approximately one minute to form the part, cooling the part to 500° F. within twenty seconds and simultaneously reducing the pressure within the part, heating the part to 1000° F. and maintaining the temperature of 1000° F. for approximately five minutes, and cooling the part.

7. A process for heat-treating, forming, and tempering a hollow part of 4340 steel comprising the steps of heating the part to a temperature of approximately 1500° F. and maintaining the temperature above 1400° F. for approximately ten minutes, maintaining an atmosphere of nitrogen about the part during heating of the part, applying a pressure of approximately 1000 p.s.i. to the interior of the part for approximately one minute to form the part, cooling the part to 500° F. within twenty seconds and simultaneously reducing the pressure within the part, heating the part to 1000° F. and maintaining the temperature of 1000° F. for approximately five minutes, and cooling the part.

8. A process for heat-treating, forming, and tempering a hollow part of 4340 steel comprising the steps of heating the part to a temperature of approximately 1500° F. and maintaining the temperature above 1400° F. for approximately ten minutes, maintaining an atmosphere of nitrogen about the part during heating of the part, supplying nitrogen to the interior of the part to maintain an interior pressure of approximately 1000 p.s.i. for approximately one minute to form the part, cooling the part to 500° F. within twenty seconds and simultaneously reducing the pressure within the part, heating the part to 1000° F. and maintaining the temperature of 1000° F. for approximately five minutes, and cooling the part.

9. A process for heat-treating, forming, and tempering a hollow part of 4340 steel comprising the steps of heating the part to a temperature of approximately 1500° F. and maintaining the temperature above 1400° F. for approximately ten minutes, maintaining an atmosphere of nitrogen about the part during heating of the part, supplying nitrogen to the interior of the part to maintain an interior pressure of approximately 1000 p.s.i. for approximately one minute to form the part, directing nitrogen over the part to cool the part to 500° F. within twenty seconds and simultaneously reducing the pressure within the part, heating the part to 1000° F. and maintaining the temperature of 1000° F. for approximately five minutes, and cooling the part.

10. A furnace having a closed heating chamber, said heating chamber having its walls shaped to produce a desired configuration, means to support a hollow part in the heating chamber, means to heat the heating chamber, means to maintain an inert atmosphere in the heating chamber when the heating means is heating the heating chamber, means to supply fluid to the interior of the part to maintain an interior pressure to urge the part against the walls of the heating chamber when the part is heated to a deformable temperature whereby the part is formed in the desired configuration, and means to cool the part when the heating means is not supplying heat to the heating chamber.

11. A furnace having a closed heating chamber, said heating chamber having its walls shaped to produce a desired configuration, means to support a hollow part in the heating chamber, means to heat the heating chamber, means to maintain an atmosphere of nitrogen in the heating chamber when the heating means is heating the heating chamber, means to supply nitrogen to the interior of the part to maintain a high interior pressure to urge the part against the walls of the heating chamber when the part is heated to a deformable temperature whereby the part is formed in the desired configuration, and means to cool the part when the heating means is not supplying heat to the heating chamber.

12. A furnace having a closed heating chamber, said heating chamber having its walls shaped to produce a desired configuration, means to support a hollow part in the heating chamber, means to heat the heating chamber, means to maintain an atmosphere of nitrogen in the heating chamber when the heating means is heating the heating chamber, means to supply nitrogen to the interior of the part to maintain a high interior pressure to urge the part against the walls of the heating chamber when the part is heated to a deformable temperature whereby the part is formed in the desired configuration, and means to circulate nitrogen through the heating chamber when the heating means is not supplying heat to the heating chamber to cool the part.

13. A furnace having a closed heating chamber with walls of ceramic, said walls being shaped to produce a desired configuration, means to support a hollow part in the heating chamber, electric means in said ceramic walls for supplying heat to the heating chamber, means to supply an inert fluid through said ceramic walls to said heating chamber to maintain an inert atmosphere in said heating chamber when said electric means is supplying heat to the heating chamber, means to supply an inert fluid to the interior of said part when it is heated to a deformable temperature to maintain a high interior pressure to urge the part into contact with said ceramic walls whereby the part is formed to the desired shape, and means to circulate an inert fluid through the heating chamber to cool the part when the electric means is de-energized.

14. A furnace having a closed heating chamber with walls of ceramic, said walls being shaped to produce a desired configuration, means to support a hollow part in the heating chamber, electric means in said ceramic walls for supplying heat to the heating chamber, means to supply an inert fluid through said ceramic walls to said heating chamber to maintain an inert atmosphere in said heating chamber when said electric means is supplying heat to the heating chamber, means to supply an inert fluid to the interior of said part when it is heated to a deformable temperature to maintain a high interior pressure to urge the part into contact with said ceramic walls whereby the part is formed to the desired shape, and means to circulate an inert fluid through the heating chamber and through the interior of the part to cool the part when the electric means is de-energized.

15. A furnace having ceramic die members forming a closed heating chamber, said die members being contoured to produce a desired configuration, means to support a hollow part in said heating chamber, means to heat the heating chamber, means to determine the temperature of the heating chamber, means to maintain an inert atmosphere in the heating chamber when the heating means is heating the heating chamber, means to circulate an inert fluid through the heating chamber when the heating means is not heating the heating chamber to cool the part, and means to supply an inert fluid to the interior of the part when the part is at a deformable temperature to maintain a high interior pressure to urge the part into engagement with the die members to produce the desired configuration.

16. A furnace including ceramic members having their inner walls shaped to provide a desired configuration, the interior of said ceramic members forming a heating chamber, means to support a hollow part in the heating chamber, means mounted in said ceramic members to heat the heating chamber, means mounted in said ceramic members to ascertain the temperature of the heating chamber, said ceramic members having passages to provide communication from the interior of the heating chamber to the exterior of the ceramic members, means to supply an inert fluid through some of said passages in said ceramic members to provide an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate and inert fluid through some of the passages in the ceramic members to the heating chamber and from the heating chamber through other of the passages in the ceramic members to cool the part when the heating means is not heating the heating chamber.

17. A furnace including ceramic members having their inner walls shaped to provide a desired configuration, the interior of said ceramic members forming a heating chamber, means to support a hollow part in the heating chamber, means mounted in said ceramic members to heat the heating chamber, means mounted in said ceramic members to ascertain the temperature of the heating chamber, said ceramic members having passages to provide communication from the interior of the heating chamber to the exterior of the ceramic members, means to supply an inert fluid through some of said passages in said ceramic members to provide an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, means to circulate an inert fluid through some of the passages in the ceramic members to the heating chamber and from the heating chamber through other of the passages in the ceramic members to cool the part when the heating means is not heating the heating chamber, and means to supply inert fluid at high velocity through the interior of the part to cool the part when the heating means is not heating the heating chamber.

18. A furnace including a support, a pair of cooperating ceramic members pivotally mounted on said support, means to hold the ceramic members in a closed position, said ceramic members having their inner walls shaped to provide a desired configuration when the members are in the closed position, the interior of said ceramic members forming a heating chamber, means to support a hollow part in the heating chamber, means to heat the heating chamber, means to ascertain the temperature of the heating chamber, means to maintain an inert atmosphere in the heating chamber when the heating means is supplying heat to the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate an inert fluid through the heating chamber to cool the part when the heating means is not supplying heat to the heating chamber 19. A furnace including a support, a pair of cooperating ceramic members pivotally mounted on said support, means to hold the ceramic members in a closed position, said ceramic members having their inner walls shaped to provide a desired configuration when the members are in the closed position, the interior of said ceramic members forming a heating chamber, means to support a hollow part in the heating chamber, means mounted in said ceramic members to heat the heating chamber, means mounted in said ceramic members to ascertain the temperature of the heating chamber, said ceramic members having passages providing communication from the interior of the heating chamber to the exterior of the ceramic members, means to supply an inert fluid through some of said passages in said ceramic members to provide an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate an inert fluid through some of the passages in the ceramic members to the heating chamber and from the heating chamber through other of the passages in the ceramic members to cool the part when the heating means is not heating the heating chamber.

20. A furnace including a support, a pair of cooperating shells pivotally mounted on said support, means to hold the shells in a closed position, each of said shells having a ceramic member mounted therein, said ceramic members having their inner walls shaped to provide a desired configuration when the shells are in the closed position, the interior of said ceramic members forming a heating chamber, means to support a hollow part in the heating chamber, means to heat the heating chamber, means to ascertain the temperature of the heating chamber, means to maintain an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate an inert fluid through the heating chamber to cool the part when the heating means is not supplying heat to the heating chamber.

21. A furnace including a support, a pair of cooperating shells pivotally mounted on said support, means to hold the shells in a closed position, each of said shells having a ceramic member mounted therein, said ceramic members having their inner walls shaped to provide a desired configuration when the shells are in the closed position, the interior of said ceramic members forming a heating chamber, means to support a hollow part in the heating chamber, means mounted in said ceramic members to heat the heating chamber, means mounted in said ceramic members to ascertain the temperature of the heating chamber said ceramic members having passages to provide communication from the interior of the heating chamber to the exterior of the shells, means to supply an inert fluid through some of said passages in said ceramic members to provide an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate an inert fluid through some of the passages in the ceramic members to the heating chamber and from the heating chamber through other of the passages in the ceramic members to cool the part when the heating means is not supplying heat to the heating chamber.

22. A furnace including a support, a pair of cooperating shells pivotally mounted on said support, means to pivotally move each of said shells between a closed position and an open position, clamping means to hold said shells in the closed position, means to unlock said clamping means, each of said shells having a ceramic member mounted therein, said ceramic members having their inner walls shaped to provide a desired configuration when the shells are in the closed position, the interior of said ceramic members forming a heating chamber, means to support a hollow part in the heating chamber, means to heat the heating chamber, means to ascertain the temperature of the heating chamber, means to maintain an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate an inert fluid through the heating chamber to cool the part when the heating means is not supplying heat to the heating chamber.

23. A furnace including a support, a pair of cooperating shells pivotally mounted on said support, means to pivotally move each of said shells between a closed position and an open position, clamping means to hold said shells in the closed position, means to unlock said clamping means, each of said shells having a ceramic member mounted therein, said ceramic members having their inner walls shaped to provide a desired configuration when the shells are in the closed position, the interior of said ceramic members forming a heating chamber, means to support a hollow part in the heating chamber, means mounted in said ceramic members to heat the heating chamber, means mounted in said ceramic members to ascertain the temperature of the heating chamber, said ceramic members having passages to provide communication from the interior of the heating chamber to the exterior of the shells, means to supply an inert fluid through some of said passages in said ceramic members to provide an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, and means to circulate an inert fluid through some of the passages in the ceramic members to the heating chamber and from the heating chamber through other of the passages in the ceramic members to cool the part when the heating means is not supplying heat to the heating chamber.

24. A furnace including a support, a pair of cooperating shells pivotally mounted on said support, means to pivotally move each of said shells between a closed position and an open position, clamping means to hold said shells in the closed position, means to unlock said clamping means, each of said shells having a ceramic member mounted therein, said ceramic members having their inner walls shaped to provide a desired configuration when the shells are in the closed position, the interior of said ceramic members forming a heating chamber, means to support a hollow part in the heating chamber, means mounted in said ceramic members to heat the heating chamber, means mounted in said ceramic members to ascertain the temperature of the heating chamber, said ceramic members having passages to provide communication from the interior of the heating chamber to the exterior of the shells, means to supply an inert fluid through some of said passages in said ceramic members to provide an inert atmosphere in the heating chamber when the heating means is heating the heating chamber, means to supply an inert fluid through said support means to the interior of the part when the part is heated to a temperature at which it is readily deformable to maintain a high interior pressure to urge the part into engagement with the inner walls of the ceramic members to form the part to the desired configuration, means to circulate an inert fluid through some of the passages in the ceramic members to the heating chamber and from the heating chamber through other of the passages in the ceramic members to cool the part when the heating means is not supplying heat to the heating chamber, and means to supply an inert fluid at high velocity through the interior of the part to cool the part when the heating means is not supplying heat to the heating chamber.

References Cited

UNITED STATES PATENTS

| | | | |
|---|---|---|---|
| 1,920,652 | 8/1933 | McKee | 148—12.4 X |
| 2,174,792 | 10/1939 | Lampton | 29—156.8 |
| 2,308,344 | 1/1943 | Andrake | 29—156.8 |
| 2,350,541 | 6/1944 | Stulen et al. | 72—61 X |
| 2,354,198 | 7/1944 | Chubb | 29—156.8 |
| 2,485,534 | 10/1949 | Mayne et al. | 29—156.8 |
| 2,493,135 | 1/1950 | Gruetjen | 148—12.4 X |
| 3,205,691 | 9/1965 | Stegler | 72—364 |

FOREIGN PATENTS

| | | |
|---|---|---|
| 8,917 | 6/1961 | Japan. |
| 9,318 | 7/1962 | Japan. |
| 118,162 | 4/1959 | U.S.S.R. |

HYLAND BIZOT, *Primary Examiner.*

W. W. STALLARD, H. F. SAITO, *Assistant Examiners.*